United States Patent [19]

Kayabara

[11] Patent Number: 4,662,044

[45] Date of Patent: May 5, 1987

[54] DESCALER AND WIRE BRUSH FOR USE IN THE SAME

[75] Inventor: Isao Kayabara, Tokyo, Japan

[73] Assignee: Tohken Co., Ltd., Tokyo, Japan

[21] Appl. No.: 851,867

[22] Filed: Apr. 11, 1986

Related U.S. Application Data

[63] Continuation of Ser. No. 528,155, Aug. 31, 1983, abandoned.

[30] Foreign Application Priority Data

Sep. 4, 1982 [JP] Japan ............ 57-134572[U]
Jul. 21, 1983 [JP] Japan ............ 58-133489

[51] Int. Cl.[4] ............ B23D 79/00

[52] U.S. Cl. ............ 29/81 H; 15/183; 15/200; 29/81 J

[58] Field of Search ............ 29/81 H, 81 J; 15/183, 15/179, 198, 200

[56] References Cited

U.S. PATENT DOCUMENTS

| | | | |
|---|---|---|---|
| 1,766,388 | 6/1930 | Kovacs | 15/183 |
| 2,600,613 | 6/1952 | Bruner et al. | 15/183 X |
| 2,790,985 | 5/1957 | Harlan | 15/183 |
| 3,228,053 | 1/1966 | Horton et al. | 15/183 |

FOREIGN PATENT DOCUMENTS

| | | | |
|---|---|---|---|
| 507062 | 9/1930 | Fed. Rep. of Germany | 15/183 |
| 815967 | 10/1951 | Fed. Rep. of Germany | 15/183 |
| 5019 | of 1905 | France | 15/179 |
| 28042 | of 1897 | United Kingdom | 15/183 |
| 690152 | 4/1953 | United Kingdom | 15/183 |

*Primary Examiner*—Howard N. Goldberg
*Assistant Examiner*—Joseph M. Gorski
*Attorney, Agent, or Firm*—Wegner & Bretschneider

[57] ABSTRACT

A descaler for removing scale from steel billet before rolling of the steel billet. The descaler has a plurality of steel wire brush units each being constituted by an elongated supporting member and a multiplicity of steel wires arranged densely along the length of the supporting member and attached to the same. The steel wire brush units are loosely mounted on a rotary drum with their supporting members extending in parallel with the axis of the drum for limited radial movement and circumferential rocking movement with respect to the rotary drum. In operation of the descaler, the steel wire brush units are projected radially outwardly by the action of the centrifugal force to strongly strike and hit the billet surface to promote the removal of the scale. Since the flexing of each wire is resisted by the bundle of densely arranged steel wires, the breakage of the steel wires is suppresed to ensure a longer life of the descaler.

5 Claims, 8 Drawing Figures

DESCALER AND WIRE BRUSH FOR USE IN THE SAME

This application is a continuation of U.S. application Ser. No. 528,155, filed Aug. 31, 1983, now abandoned.

BACKGROUND OF THE INVENTION

The present invention relates to a descaler for use in iron works for descaling, i.e. removal of oxide film called scale formed on the surfaces of billets, slabs and steel sheets (referred to merely as "steel billet", hereinafter), conducted as a pretreatment in advance of a hot or cold rolling process.

The removal of the scale from the surfaces of steel billets in the hot state hitherto has been made mainly by use of a jet of pressurized water. This method, however, is not preferred partly because of an insufficient descaling effect and partly because of necessity for large electric power in pressurizing the water and uneconomically large energy consumption in the rolling due to excessive cooling of the material by the application of the water jet.

In order to obviate this problem, a rotary-brush type descaling apparatus has been proposed, having a rotary brush composed of a multiplicity of steel wires attached to the surface of a rotary drum. This descaling apparatus, however, cannot be applied satisfactorily to the surface of the steel billet because the steel wires, which are independently fixed to the drum surface, are easily flexed and thus fail to impart a sufficiently large impact to the steel billet surface. In addition, the steel wires are liable to be broken during operation, making the apparatus unusable in an impractically short period of time.

Under this circumstance, there is an increasing demand in the field of industry involved, for the development of a descaler having a sufficient descaling effect and durability and capable of performing the descaling economically with reduced labor.

SUMMARY OF THE INVENTION

Accordingly, an object of the invention is to provide a descaler which can cope well with the above-mentioned demands in the field.

Another object of the invention is to provide a rotary-brush type descaler which permits easy renewal of worn or broken brushes.

Still another object of the invention is to provide a rotary-brush type descaler which can be produced at a reduced cost.

A further object of the invention is to provide a steel wire brush unit for rotary-brush type descaler, capable of providing a high descaling effect and high descaler durability.

To these ends, according to the invention, there is provided a descaler comprising: a rotatable drum; and a plurality of steel wire brush units each having an elongated supporting member and a bundle of a multiplicity of steel wires arranged along the length of the supporting member and projected therefrom in one direction; the steel wire brush units being disposed on the outer peripheral surface of the rotary drum such that the supporting members extend in parallel with the axis of the rotary drum while the steel wires are directed radially outwardly, and being mounted on the rotary drum in such a manner as to be able to move radially inwardly and outwardly within a limited range in the radial direction and to rock or oscillate within a predetermined circumferential range.

In this descaler of the invention, the steel wire bundles are made to project radially outwardly from the rotary drum surface due to centrifugal force produced during the high-speed rotation of the rotary drum. The steel wires of bundles thus projected successively strike and hit the scale on the surface of the billet to break or crack the same, while scraping the surface of the billet in the circumferential direction, thereby easily removing the scale without damaging the portion of the steel billet under the scale. The steel wire bundles are supported for radial movement and for rocking motion in the circumferential direction, so that the steel wires can follow the curved surface of the billet without being excessively flexed when contacting the billet surface, thereby effectively removing the scale.

According to one aspect of the invention, the rotary drum has a cylindrical cage-like drum body and an inner drum member, the drum body being composed of a pair of stay rings opposing each other and arranged coaxially with the axis of rotation of the rotary drum, a plurality of stays having a rectangular cross-section and arranged at a constant angular pitch around the axis of rotation so as to be fixed at their both ends to the outer peripheries of the stay rings, and a plurality of fixing members having a concave inner surface and connected to adjacent stays at a predetermined pitch along the length of the stays, the inner drum member being fixed detachably at both its ends to the inner peripheries of the stay rings.

According to this arrangement, the space defined by the stays and the fixing members is utilized for mounting the steel wire brush unit, so that the production cost can be reduced remarkably as compared with the case where the rotary drum is fabricated from a cylindrical blank and formed with elongated holes for mounting the steel wire brush unit by cutting the blank.

According to the invention, there is further provided a steel wire brush unit for use in a descaler having a rotary drum loosely supporting on the circumference thereof a plurality of the steel wire brush units in spaced relationship with one another for limited radial movement and rocking movement with respect to the drum, the steel wire brush unit comprising: an elongated supporting member; a bundle of a multiplicity of straight steel wires of a predetermined length bent in a U-like form to straddle the supporting member and arranged densely along the length of the supporting member; and a tie band having both flat surfaces which extend in parallel with the supporting member so as to contact the opposite sides of the bundle of the steel wires adjacent to the straddling portion thereby to bind and tighten the bundle of steel wires to provide the bundle of rectangular cross-section.

The steel wire brush unit having the construction stated above, in which all of the steel wires straddle the supporting member and are bound at their base portions, reduces the tendency of breakage of the steel wire due to the tensile force applied thereto. In addition, each bundle of steel wires, when impacted at its free end, exhibits a large resistance to the bending force because the resiliencies of independent steel wires are totalized in each bundle. In a preferred form of the invention, the steel wire bundle is held at its both ends by U-sectioned protecting plates, so that the tendency of the steel wires at both ends of the bundle becoming frayed, which is caused due to the natural pressure of air during the rotation, is eliminated to ensure an effective use of all steel wires in each bundle.

Other objects, features and advantages of the invention will become clear from the following description of the preferred embodiments taken in conjunction with the accompanying drawings.

DESCRIPTION OF THE PREFERRED EMBODIMENTS

Figure 1:
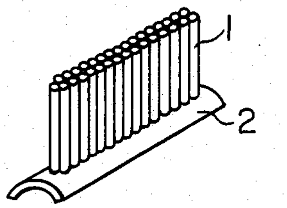
FIG. 1 is a perspective view of an embodiment of a wire brush unit as used in a descaler in accordance with the invention.

Referring first to FIG. 1, a wire brush unit is composed of a bundle of hard steel wires 1 and a supporting member 2 in which the steel wires constituting the bundle are planted. The steel wire bundle 1 is rigidly connected to the supporting member 2 by welding. The supporting member 2 is formed from a curved steel sheet to have a shape like a trough, so that the steel wire bundle can oscillate smoothly when a rotary drum to which the steel wire brush unit is attached is rotated, as will be explained later.

Figure 2:
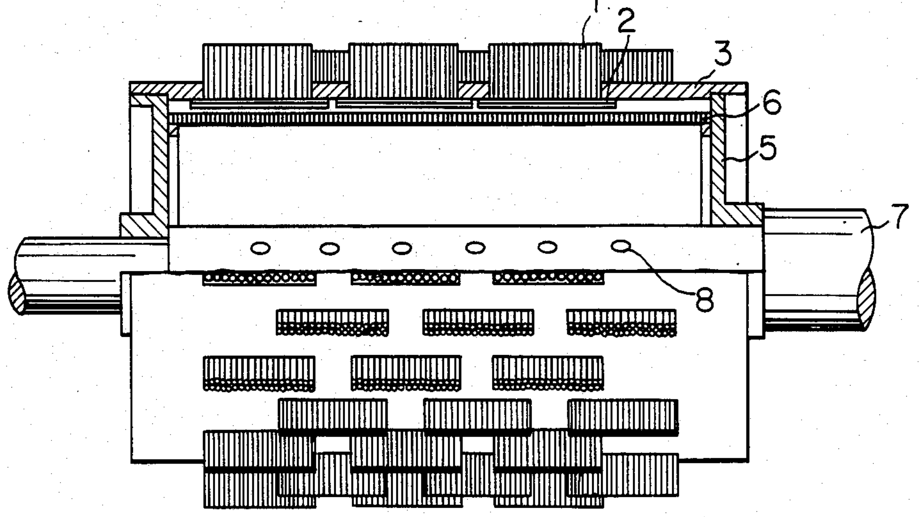
FIGS. 2 and 3 are a side elevational view and a front elevational view of an embodiment of the descaler of the invention, with the upper half part of a rotary drum cut and removed to show the internal structure.
Figure 3:
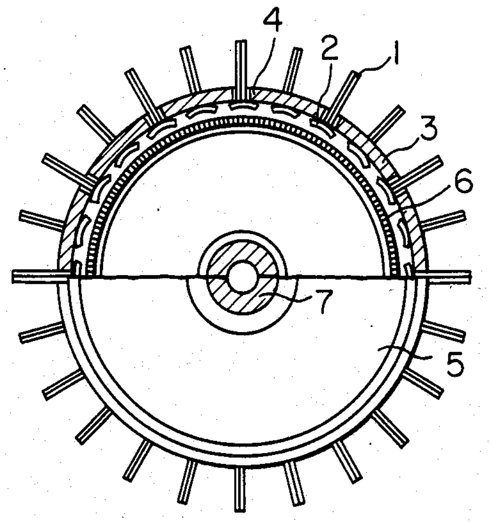

Referring to FIGS. 2 and 3, reference numeral 3 designates an outer drum member having a plurality of elongated holes formed in the surface thereof, for receiving the steel wire brush units as described above. The width of the elongated hole 4 is selected to have a sufficient margin with respect to the thickness of the steel wire bundle 1, so that the steel wire bundle can be rocked or oscillated to the left and right. The elongated holes are formed in such a staggered manner that the axes of the steel wire brush units extend in parallel with the axis of the rotary drum and that the adjacent axial rows of the steel wire brush units are offset alternatingly in the axial direction.

The outer drum member 3 is coupled with a shaft 7 through flanges 5, 5 which are attached to both axial ends thereof. An inner drum member 6 is fitted to the inside of the outer drum member 3 to extend between both flanges 5 and 5. The outer peripheral surface of the inner drum member 6 is radially spaced from the outer drum member 3 to radially movably dispose the supporting member 2 of the wire brush units therebetween, and prevents the steel wire brush units from coming off radially inwardly.

The rotary shaft 7 is hollow and adapted to be supplied with a refrigerant through one end thereof. The refrigerant is introduced through apertures 8 formed in the wall of the shaft 7 into the space in the drum and then discharged through minute holes formed in the inner drum member 6 and the elongated holes 4 in the outer drum member 3 thereby to effectively cool the steel wires.

The drum thus fabricated constitutes a cylindrical rotary brush assembly. This cylindrical rotary drum assembly is used as an essential part of the descaler of the invention. In operation, this cylindrical rotary brush assembly is rotated at a predetermined speed, so that the steel wire brush units, which are not pulled radially inwardly, are projected radially outwardly due to the centrifugal force, which is a function of the mass of the unit and the rotation speed. As the ends of the steel wires of the brush units are brought into contact with the billet surface, the wire ends strongly strike and hit the scale on the billet surface due to the action of the centrifugal force to crush and crack the scale. In addition, the wire ends serve also to produce tangential scraping force to easily remove the scale from the billet sufface.

According to the invention, it is possible to easily renew the wire brush unit as a consumable part. In addition, the invention permits the selection of diameter and length of the steel wires, as well as the weight of the supporting member, so as to provide the optimum descaling condition, considering factors such as the thickness to be removed, in accordance with the kind of the scale to be removed.

In the case of descaling from a red-hot steel billet before hot rolling, the steel billet is still held at high temperature of 800° to 1000° C. and, hence, posseses a huge amount of heat, so that the ends of the steel wires are naturally heated upon contact with the billet surface. However, the rigidity and resiliency of the steel wires are not decreased substantially, because the portion of the descaler other than the portion contacting the steel billet is covered by a double-walled heat-insulating cover consisting of two walls defining therebetween a space for a cooling medium such as water or a refrigerant, not shown.

The descaler of the invention can be used as a stationary descaling machine or a movable descaling machine carried by an arm. In either case, the descaler can be operated by remote control without substantial difficulty.

Figure 4:
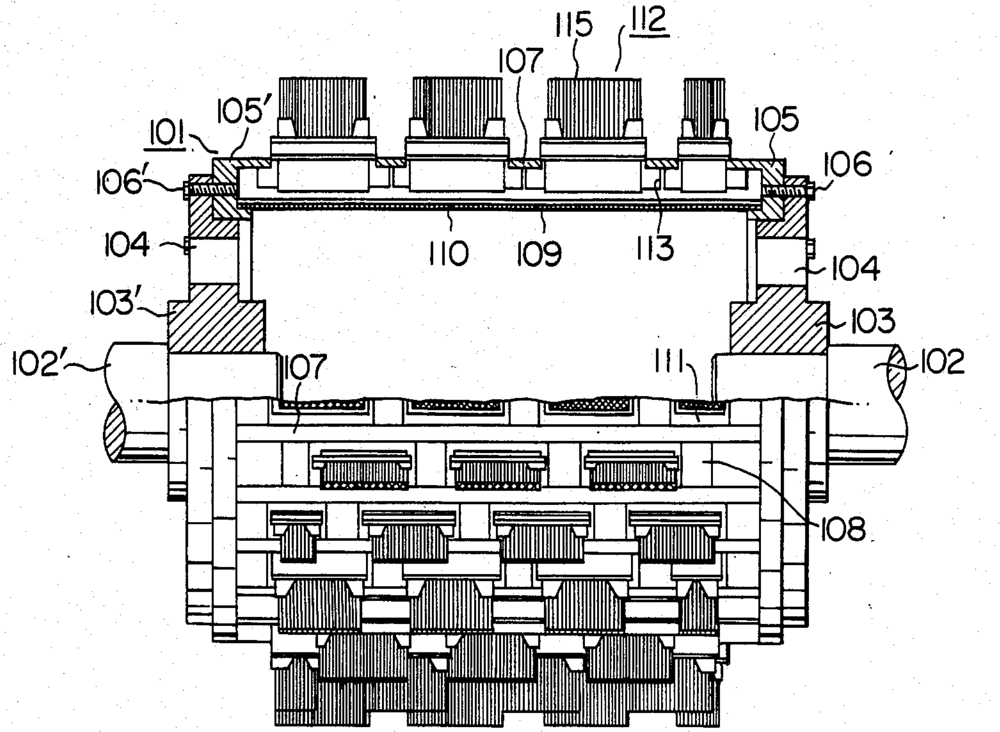
FIG. 4 is a side elevational view of another embodiment of the descaler of the invention, with the upper half part thereof cut along the line IV—IV of FIG. 5 to show the internal structure.
Figure 5:
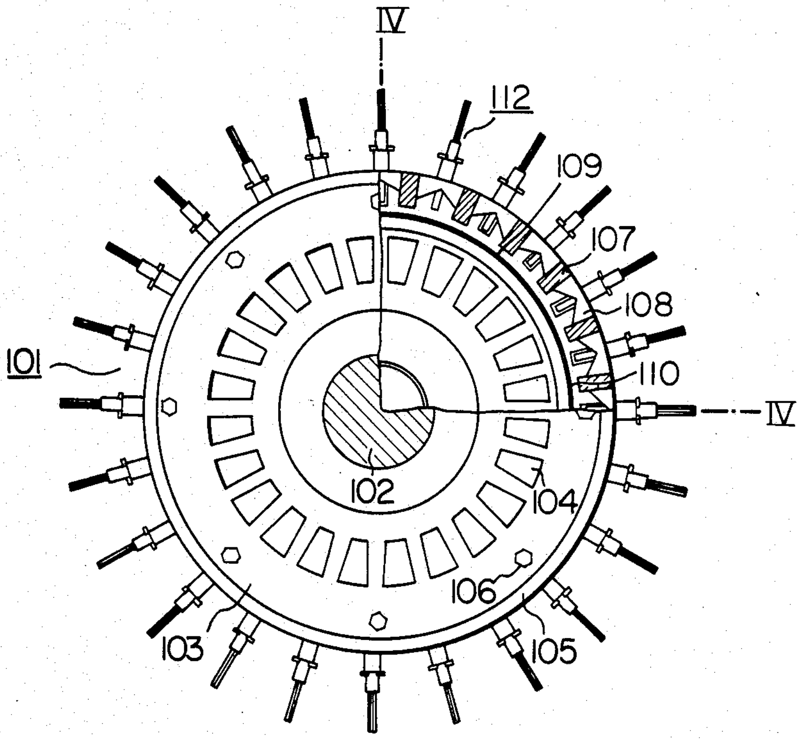
FIG. 5 is a front elevational view of the descaler shown in FIG. 4 with a quarter thereof removed to show the internal structure.

FIGS. 4 and 5 show another embodiment of the descaler in accordance with the invention. A rotary drum generally designated at numeral 101 is provided at both ends thereof with respective rotary shafts 102 and 102' coaxial with each other. Flanges 103 and 103', each having a plurality of windows 104 formed at a constant angular pitch, are attached to respective rotary shafts 102 and 102'. Stay rings 105 and 105' are fixed by means of bolts 106 and 106' to the peripheries of the flanges 103 and 103'. A plurality of stays 107, 107', extending in parallel with the axis of the rotary drum, are connected between two stay rings 105 and 105' at a constant angular pitch, i.e. at a constant pitch in the circumferential direction. Adjacent stays 107 and 107 are connected to each other through fixing members 108 welded thereto at a constant pitch along the lengths thereof, so that a sufficiently high strength is obtained in the circumferential direction. For a reason which will be stated later, the fixing member 108 has a concave inner surface of V-shaped cross-section as will be seen from FIG. 5. The fixing members of adjacent axial rows are offset from each other in the axial or longitudinal direction, so that steel wire brush units, which are fitted between adjacent fixing members of respective axial rows, are arranged in a staggered form to make the descaling effect uniform over the entire portion of the descaler. The stay rings 105, 105', stays 107 and the fixing members 108 thus assembled and welded together form a cylindrical cage type drum body. If the drum is required to have a large length, this cage-type structure may fail to provide a sufficient resistance or rigidity against torsional external force. In such a case, it is advisable to unite the rotary shafts 102 and 102' with each other or to connect these shafts 102 and 102' through an intermediate shaft. An inner drum member 110 having a multiplicity of apertures 109 over the entire area thereof is disposed within the space defined by the stays 107 and is supported at its both ends by the stay rings 105 and 105'. The inner drum member 110 limits the range of radial movement of the steel wire brush units and prevents the latter from coming off radially inwardly. The rectangular spaces 111 defined by the stays 107 and fixing members 108 constitute elongated holes through which the bundles of wires of the steel wire brush units are projected radially outwardly. Unlike the rotary drum 1 of the first embodiment shown in FIGS. 2 and 3, the rotary drum 101 of this embodiment does not require machining for the formation of the elongated holes for mounting the steel wire brush units and, hence, can be fabricated at a lower cost than that of the first embodiment.

Figure 6:
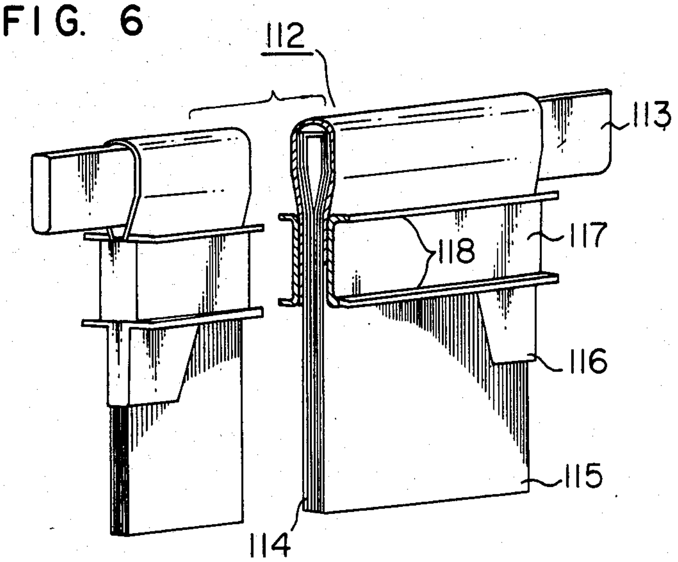
FIGS. 6 and 7 are a rear perspective view and a front elevational view of another embodiment of the steel wire brush unit.
Figure 7:
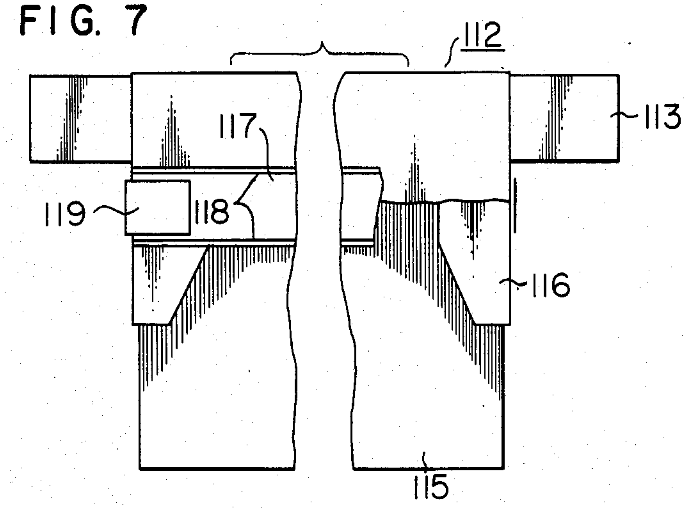
Figure 8:
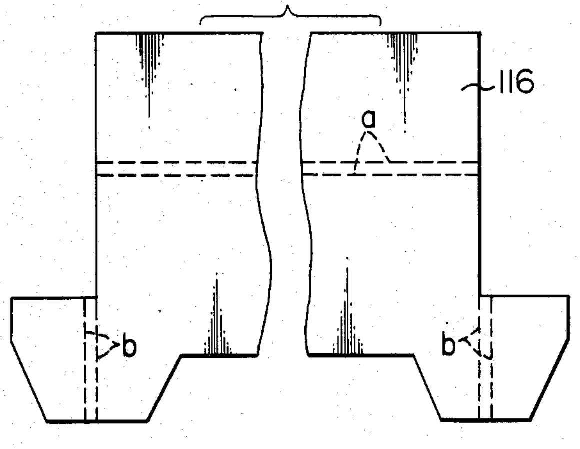
FIG. 8 is a developed view of a protecting plate as used in the wire brush unit shown in FIGS. 6 and 7.

As will be seen from FIGS. 6 and 7, the steel wire brush unit 112 has a web-like supporting member 113 and a multiplicity of steel wires 114 which are bent in a U-like form so as to straddle the supporting member 113 and arranged densely along the length of the supporting member. If necessary, the steel wires are stacked in, for example, two, three or four layers so as to form a bundle 115 of steel wires. The ends of the supporting member 113 project outwardly from both ends of the steel wire bundle 115. Although not required, the supporting member 113 of the illustrated embodiment has a rectangular cross-section at both end portions thereof emerging from both ends of the steel wire bundle 115 and, at its portion straddled by the steel wires, a wedge-shaped cross-section to facilitate the attaching of the steel wire. A part of each end of the steel wire bundle is held by a protecting plate 116 which is made from a bendable sheet member such as zinc plate. In the illustrated embodiment, the protecting plate 116 has a form as shown in FIG. 8 in the developed state before the attaching. The plate 116 is first bent along the broken lines a to cover the portion of the steel wire bundle 115 straddling the supporting member 113 and is then bent along the broken lines b to cover suitable portions of both ends of the steel wire bundle. Furthermore, the portion of the steel wire bundle 115 just below the straddling portion and covered by the protecting plate 116 is fastened and bound by a tie band 117 which is superposed to the protecting plate. More specifically, the tie band is composed of a pair of steel sheets, each of which is provided at its longitudinal edges with ribs 118 for obtaining sufficiently high rigidity. In assembly, one of these steel sheets is retained by tabs 119 of the other steel sheet so as to embrace and hold the steel wires through the protecting plate 116.

The steel wire brush unit 112 is attached to the rotary drum 101 shown in FIGS. 4 and 5 in a manner explained hereinunder. As the first step, bolts 106, 106' are withdrawn to disconnect the cylindrical cage-like assembly, which is constituted by the stay rings 105, 105', stays 107, fixing members 108 and the inner drum member 110, from the flanges 103, 103'. Then, after detaching the inner drum member 110 from the assembly, the steel wire brush units are mounted one by one such that both ends of the supporting member 113 engage with the concaved surfaces of the fixing members 108 while the free end of the steel wire bundle 115 is projected through the elongated hole 111 from the inside of the assembly. After mounting all steel wire brush units in the manner described, the inner drum member 110 is attached again to the stay rings 105, 105' which in turn are then fixed to the flanges 103, 103' by means of the bolts 106, 106'. The diameter of the inner drum member 110 is so selected as to permit the supporting member of the steel wire brush unit to move radially outwardly and inwardly within a limited space defined by the apex of the concavity of the fixing member 8 and the inner drum member 110, while the circumferential pitch of the stays 107 is so selected as to permit the steel wire brush unit 112 to rock or oscillate in the circumferential direction within a limited range.

The windows 104 formed in the flanges 103 and 103' are utilized as the passages for introducing a cooling fluid such as air, water or the mixture thereof into the drum. During the operation of the descaler of this embodiment, the bundles of the steel wire brush units serve just as vanes of a centrifugal blower, so that the cooling fluid introduced into the drum is sucked through the elongated holes 111 and is discharged radially outwardly therefrom to effectively cool the steel wire brush units. Meanwhile, the inner drum member 110 and its apertures 109 serve to uniformly distribute the cooling fluid over the entire area of the drum surface.

The descaler of the invention described heretofore can be applied not only to the descaling of the billet before hot rolling but to the descaling of steel sheets or coils before cold rolling.

Although the invention has been described through specific terms, it is to be noted here that the described embodiments are only illustrative and various changes and modifications may be imparted thereto without departing from the scope of the invention which is limited solely by the appended claims.

What is claimed is:

1. A descaler for descaling scale formed on surfaces of steel billets, slabs and sheets, comprising:
   - a rotary drum having an axis and an outer surface, comprising:
     - a cylindrical, cage-like outer drum member provided with a plurality of axially elongated holes arranged in a plurality of equiangularly spaced axial rows, with said holes in one row being in an overlapping staggered relationship with the holes in an adjacent row, said outer drum comprising: a pair of opposed stay rings, each having an inner periphery and an outer periphery and being arranged co-axially with the axis of the rotary drum; a plurality of stays of rectangular cross-section, each having first and second ends secured to the outer peripheries of the stay rings and arranged equiangularly around the axis of the rotary drum; and a plurality of fixing members, each having a concave inner surface, and each interconnecting adjacent stays at predetermined distances along the stays, said stays and fixing members defining said elongated holes; and
   - an inner drum member having first and second ends mounted detachably to the inner peripheries of the stay rings, disposed concentrically within said outer drum member, and having an inner peripheral surface and an outer peripheral surface;

a plurality of descaling units on the outer surface of said rotary drum, each of said descaling units comprising:

an elongated supporting member oriented with its length extending substantially parallel to the axis of the rotary drum and its height and width extending substantially perpendicular to the axis of the rotary drum;

a bundle of substantially parallel steel wires of substantially equal length tightly packed along the length of said supporting member, straddling said supporting member, and projecting outwardly therefrom to form a striking surface for cracking scale with opposite ends of the supporting member extending axially out of the bundle, each bundle of wire having two major face portions each having a length extending parallel to the height of said supporting member, a tip striking portion and two side portions, said descaling units being mounted on said rotary drum with each supporting member located between the outer drum member and the inner drum member and the bundles of steel wires extending radially outwardly through the elongated holes, the outer and inner drum members being radially separated by a distance which is greater than the height of each supporting member in order to permit radial movement of the supporting members relative to the drum members, each of said elongated holes having a width which is greater than the width of each supporting member in order to leave a space adjacent to each bundle of steel wire to permit circumferential movement of the bundles relative to the drum members, the supporting member of each descaling unit engaging inner surfaces of two adjacent fixing members, the radial movement of each descaling unit being limited by the inner surface of the fixing members and the outer peripheral surface of the inner drum, and the circumferential movement of each descaling unit being limited by engagement of the descaling unit with opposing stays.

2. The descaler of claim 1, wherein the rotary drum comprises a pair of opposing flanges secured to at least one rotary shaft, said outer drum being detachably fixed to said flanges, said flanges being provided with a plurality of windows so that cooling fluid may be introduced to an interior portion of the rotary drum through the windows, the inner drum being provided with a plurality of apertures so that cooling fluid may pass through the inner drum and the elongated holes to cool the steel wires of the descaling units.

3. The descaler of claim 1, wherein said bundle comprises a plurality of steel wires bent in a U-like form straddling the support member, each descaling unit further comprising a tie band having opposing flat surfaces extending substantially parallel to the supporting member and contacting opposite sides of the bundle to tighten the bundle into a form having a substantially rectangular cross-section.

4. The descaler of claim 3, wherein each descaler unit comprises a U-shaped metallic protecting plate which covers at least a part of both axial side portions of the bundle emerging from the tie band to prevent steel wires from being separated and individually moved.

5. A descaler for descaling scale formed on surfaces of steel billets, slabs and sheets, comprising:

a rotary drum having an axis and an outer surface, comprising:

an outer drum member provided with a plurality of axially elongated holes arranged in a plurality of equiangularly spaced axial rows, with said holes in one row being in an overlapping staggered relationship with the holes in an adjacent row; and an inner drum member disposed concentrically within said outer drum member, and having an inner peripheral surface and an outer peripheral surface;

a plurality of descaling units on an outer surface of said rotary drum, each of said descaling units comprising:

an elongated supporting member oriented with its length extending substantially parallel to the axis of the rotary drum, and its height and width extending substantially perpendicular to the axis of the rotary drum;

a bundle of substantially parallel steel wires of substantially equal length tightly packed along the length of said supporting member, straddling said supporting member, and projecting outwardly therefrom to form a striking surface for cracking scale, with opposite ends of the supporting member extending axially out of the bundle, each bundle of wire having two major face portions each having a length extending parallel to the height of said supporting member, a tip striking portion and two side portions, said descaling units being mounted on said rotary drum with each supporting member located between the outer drum member and the inner drum member with the bundles of steel wires extending radially outwardly through the elongated holes, the outer and inner drum members being radially separated by a distance which is greater than the height of each supporting member in order to permit radial movement of the supporting members relative to the drum members, each of said elongated holes having a width which is greater than the width of each supporting member in order to leave a space adjacent to each bundle of steel wire to permit circumferential movement of the bundles relative to the drum members, each descaling unit further comprising a U-shaped protecting plate having a base portion covering a base portion of the bundle, two face portions extending from the base portion of the plate and extending along at least one-third of the length of each major face of the bundle to expose the striking surface of the bundle, and tab portions extending from the face portions of the protecting plate and covering both side portions of the bundle to prevent the steel wires from being bent and individually moved, each descaling unit further comprising a tie band having opposite flat surfaces which extend substantially parallel to the supporting member and contact portions of opposing outer surfaces of the protecting plate adjacent to the base portion of the plate to tigthen the bundle into a form of substantially rectangular cross-section.

* * * * *